United States Patent [19]
Liem

[11] Patent Number: 5,464,305
[45] Date of Patent: Nov. 7, 1995

[54] CONNECTOR ASSEMBLY FOR CONNECTING BOARD-LIKE MEMBERS OF A PIECE OF FURNITURE IN FITTING MANNER

[75] Inventor: Tien Lumg Liem, Pan-chiao, Taiwan

[73] Assignee: Chyuan Ryh Shing Co., Ltd., Taipei Hsien, Taiwan

[21] Appl. No.: 275,070

[22] Filed: Jul. 14, 1994

[51] Int. Cl.[6] ............................. F16B 12/10; F16B 17/00
[52] U.S. Cl. ...................... 403/362; 108/180; 108/192; 403/286; 403/294; 403/361; 403/406.1
[58] Field of Search ............................. 108/27, 157, 180, 108/192; 403/286, 292, 294, 299, 306, 361, 362, 365, 406.1, 409.1

[56] References Cited

U.S. PATENT DOCUMENTS

| | | | |
|---|---|---|---|
| 2,682,684 | 7/1954 | Kraft | 403/292 X |
| 2,942,924 | 6/1960 | Stangert | 108/27 X |
| 3,980,408 | 9/1976 | Jachmann | 403/362 X |
| 4,756,639 | 7/1988 | Hoshino | 403/306 X |
| 4,836,485 | 6/1989 | Cooper | 403/306 X |
| 4,912,809 | 4/1990 | Scheuer | 403/362 X |
| 5,286,130 | 2/1994 | Mueller | 403/362 X |

FOREIGN PATENT DOCUMENTS

| | | | |
|---|---|---|---|
| 436684 | of 1912 | France | 108/157 |
| 2445429 | 4/1976 | Germany | 403/292 |
| 3405591 | 8/1985 | Germany | 108/180 |

Primary Examiner—Dave W. Arola
Assistant Examiner—Andrea Chop
Attorney, Agent, or Firm—Pro-Techtor International

[57] ABSTRACT

A connector assembly for connecting board-like members of a piece of furniture in a fitting manner, comprising more than one arch rod member having a male end and a female end, wherein the male end includes a tenon and the female end is formed with a hole corresponding to the tenon, whereby the tenon is fitted and locked in the hole to clamp and connect the board-like members to form the piece of furniture.

1 Claim, 4 Drawing Sheets

5,464,305

CONNECTOR ASSEMBLY FOR CONNECTING BOARD-LIKE MEMBERS OF A PIECE OF FURNITURE IN FITTING MANNER

BACKGROUND OF THE INVENTION

The present invention relates to a connector assembly for connecting board-like members of a piece of furniture in fitting manner.

Conventionally, the board-like members, especially glass-made board-like members of a piece of furniture, such as the board-like support legs 10 of a table are connected with one another by a unitary connector 1 as shown in FIG. 1. The connector 1 includes a frame-like main body 11 and four pairs of parallel fin plates 12 radially extending outward from the main body 11. Each pair of fin plates 12 define a clamping channel 120 for clamping a board-like support leg 10 of the table therein. Screws 13 are passed through several holes of the fin plates 12 to secure the support leg 10 between the fin plates 12. Such connector 1 is made by a mold and has a fixed shape and unchangeable number of fin plates. Therefore, different types of furniture with varying numbers of support legs need different types of connectors having different numbers of fin plates to connect the support legs. These connectors must be manufactured by different molds. This increases the manufacturing cost of the furniture. Furthermore, the clamping channel 120 between the fin plates 12 has a fixed width so that only a board-like member having a specific thickness can be snugly clamped in the clamping channel 120. In addition, the board-like support leg 10 is locked with the connector 1 by screws 13 which are likely to loosen after a period of use. This may lead to the detachment of the support legs from a table face of the table and cause danger.

SUMMARY OF THE INVENTION

It is therefore a primary object of the present invention to provide a connector assembly for connecting board-like members of a piece of furniture in a fitting manner. The connector assembly includes several arch rod members which can be varyingly combined to connect multiple types of board-like members of the furniture.

The present invention can be best understood through the following description and accompanying drawing, wherein:

DETAILED DESCRIPTION OF THE PREFERRED EMBODIMENT

Figure 1:
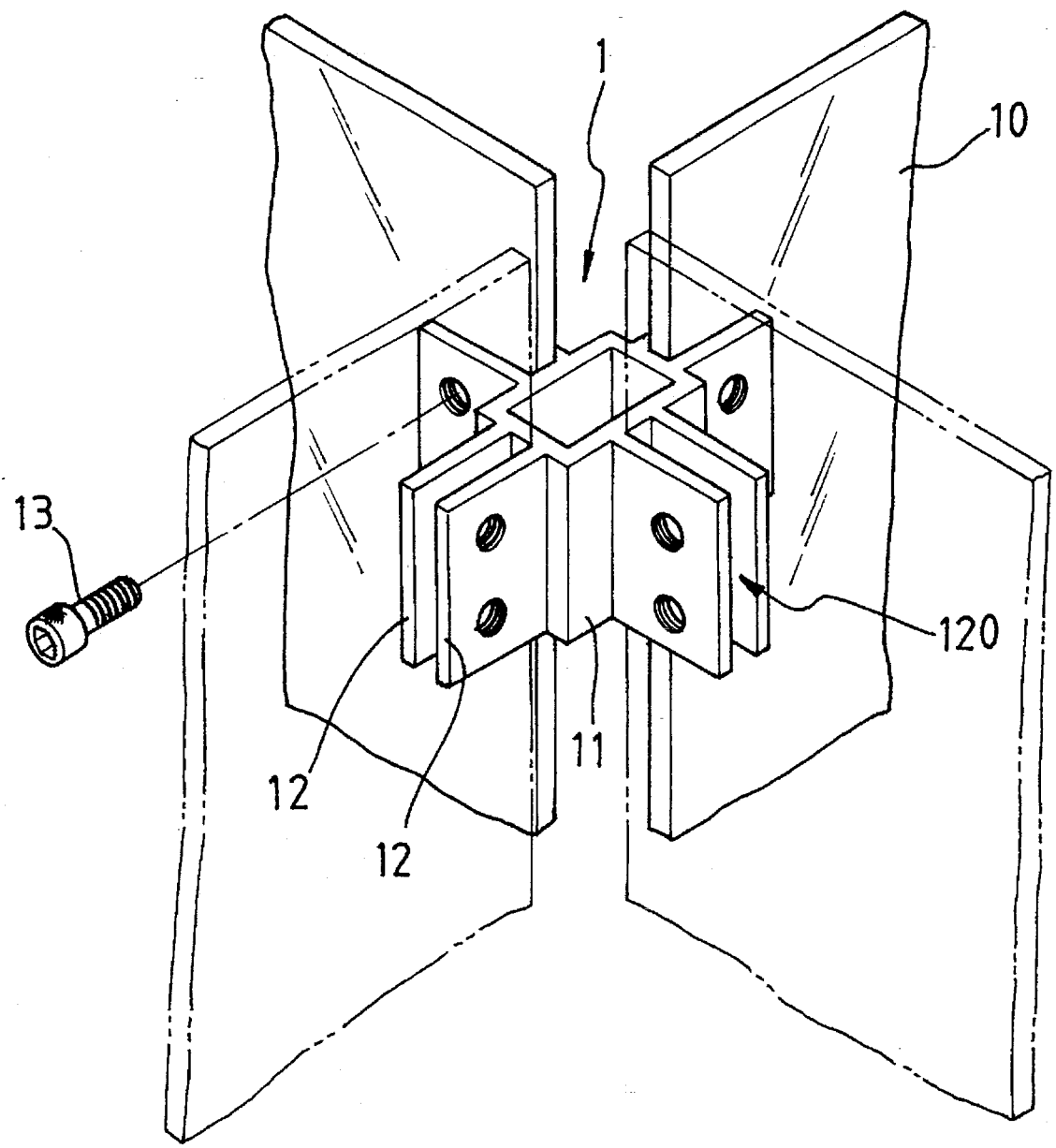
FIG. 1 is a perspective view of a conventional connector for connecting board-like members of a piece of furniture.
Figure 2:
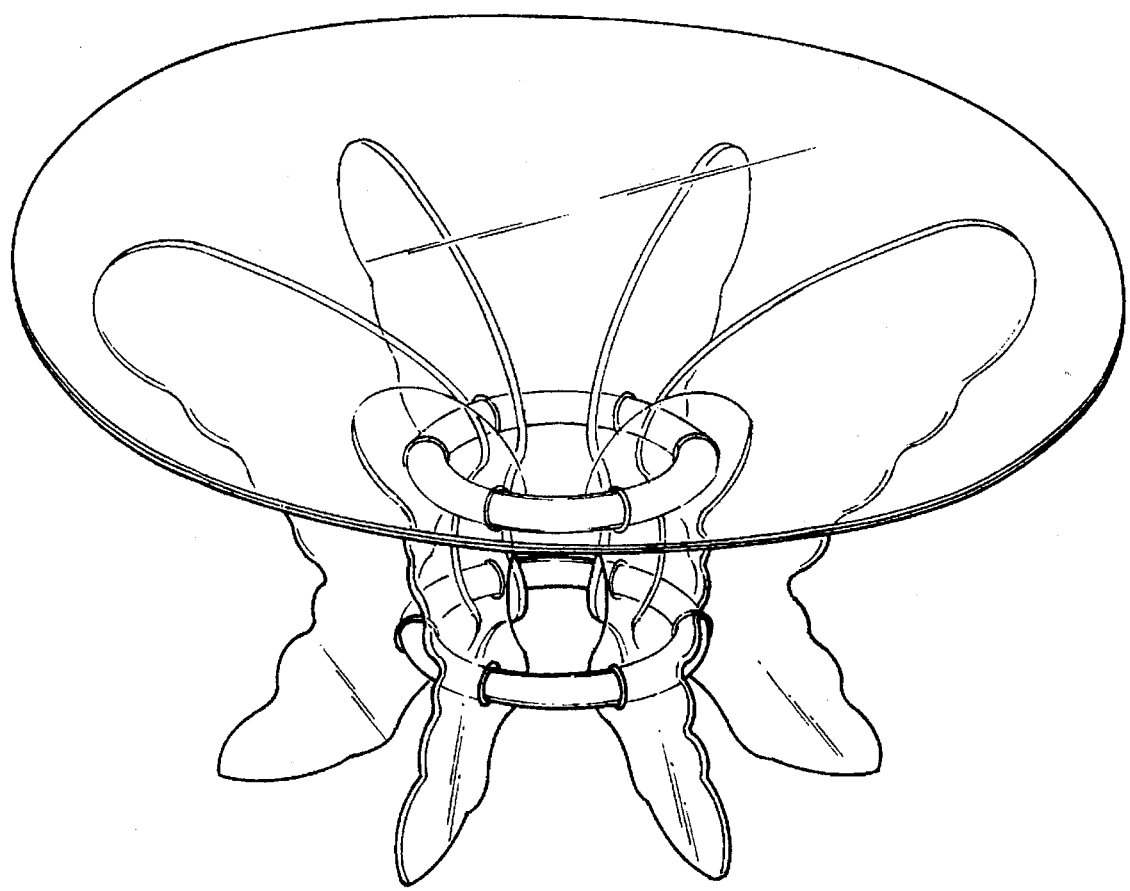
FIG. 2 shows that the connector assembly of the present invention is used to connect board-like support legs of a table.
Figure 3:
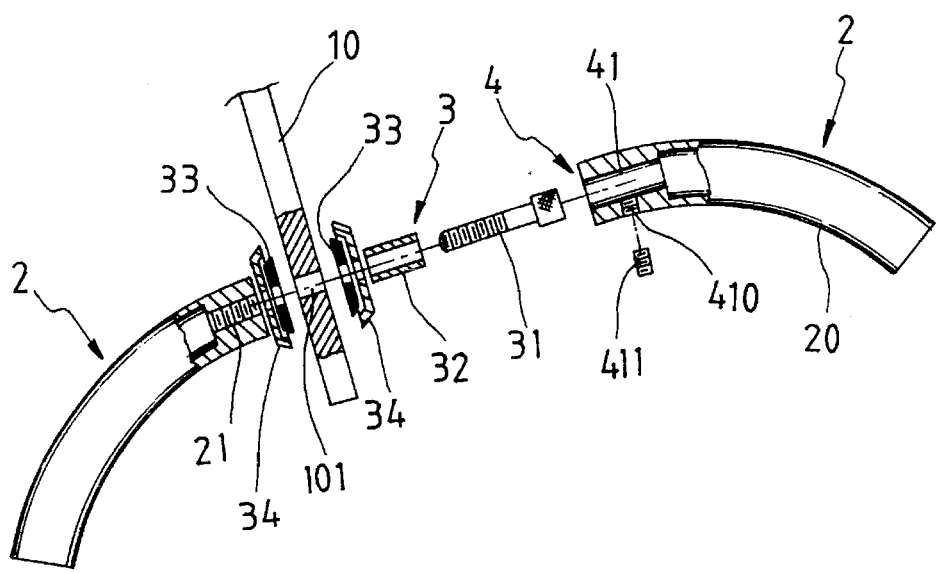
FIG. 3 is a sectional exploded view showing the male and female ends of the arch rod members of the present invention.
Figure 4:
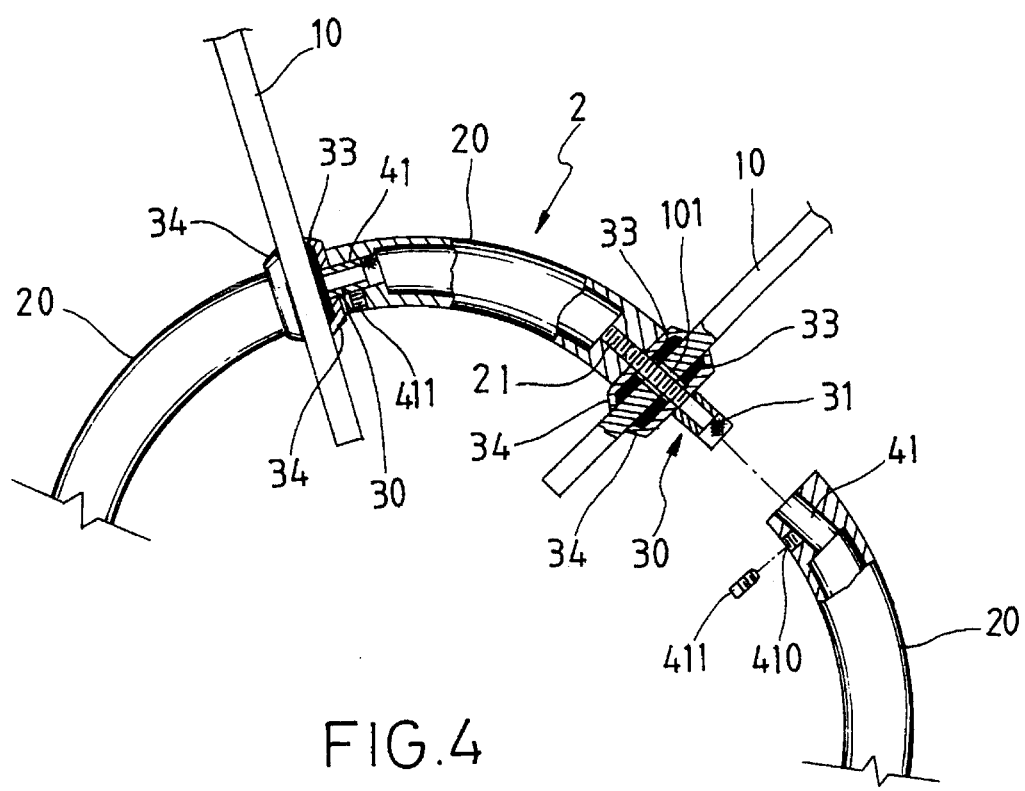
FIG. 4 is a sectional assembled view according to FIG. 3, showing that the board-like members are clamped between the male and female ends of the arch rod members.

Please refer to FIGS. 2 and 3. The connector 2 of the present invention includes an arch hollow rod member 20 having a male end 3 and a female end 4. At the male end 3, a screw 31 fitted into a sleeve 32 is locked in a threaded hole 21 of the male end 3 of the rod member 20 to form a cylindrical tenon 30 ( as shown in FIG. 4 ). The female end 4 of the rod member 20 is disposed with a circular hole 41 for the tenon 30 to insert therein. A radial threaded hole 410 is formed beside the circular hole 41 for a fixing thread rod 411 to screw therein. When assembled, the screw 31 is first fitted through the sleeve 32 and locked in the threaded hole 21 to form the cylindrical tenon 30 which first passes through a through hole 101 of a glass board 10 and then fits into the circular hole 41 of the female end 4 of another rod member 20. After the tenon 30 is inserted into the circular hole 41, the fixing thread rod 411 is screwed into the threaded hole 410 to lock the tenon 30 with the female end 4. At this time, the glass board 10 is clamped between the male end 3 and the female end 4. The depth of the insertion of the tenon 30 into the circular hole 41 can be easily adjusted so that the thickness of the clamped glass board 10 can be varied within a range. In addition, flexible pad members 33 can be added to the male and female ends 3, 4 to absorb the shocking force exerted thereon so as to protect the glass board 10. A reinforcing metal pad member 34 can be further disposed on an outer side of the flexible pad member 33 to cover the same. Multiple arch rod members can be associated together to form a circular combination so as to provide a stable and safe supporting effect.

Figure 5:
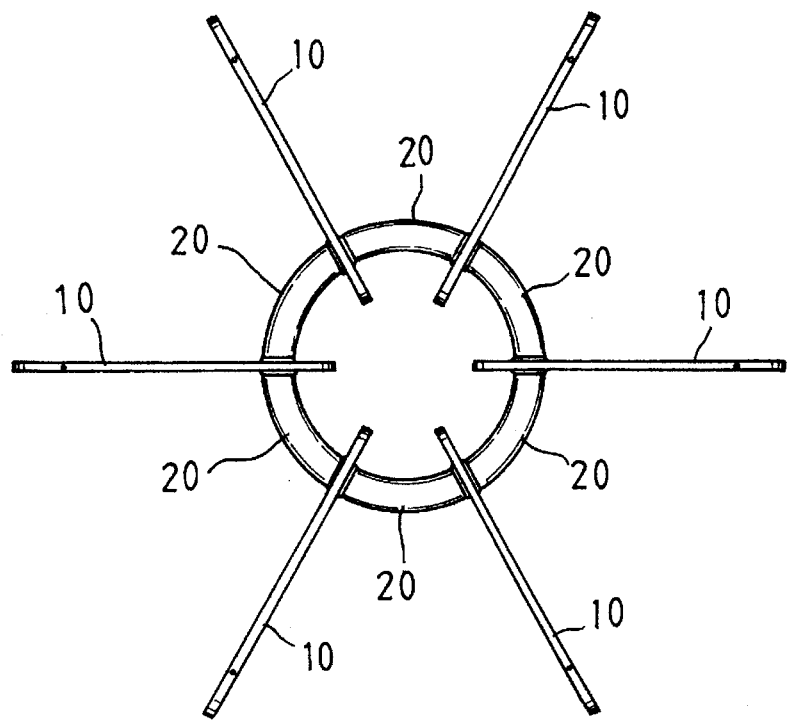
FIG. 5 shows that six arch rod members are used to connect six board-like members.
Figure 6:
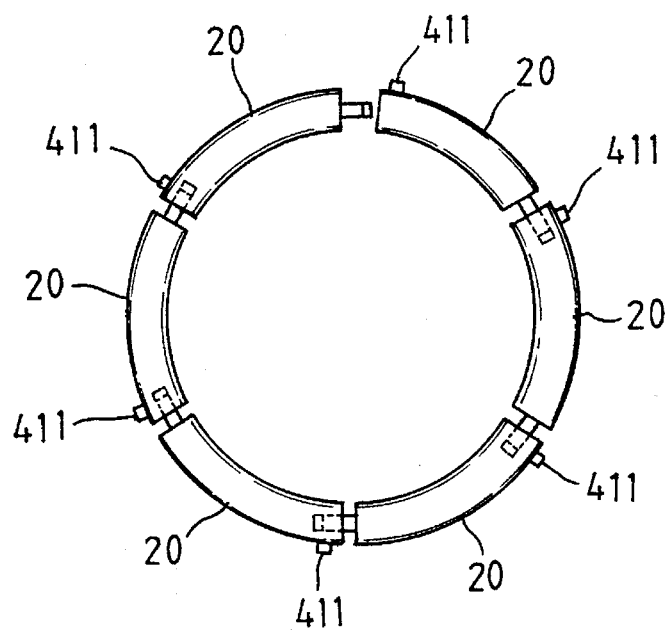
FIG. 6 shows that the fixing thread rods are not tightened before all the arch rod members are fitted with one another.

Please refer to FIGS. 5 and 6. The circular combination can include six arch rod members 20 The male and female ends of the six arch rod members 20 are fitted with one another in sequence to clamp and associate six glass boards 10 which serve as support legs of a table. For maintaining an adjusting clearance between the male end of sixth rod member 20 and the female end of the first rod member 20, all the fixing thread rods 411 are not completely tightened as shown in FIG. 6 and after all the tenons of the male ends of the rod members 20 are preliminarily fitted into the female ends thereof, the fixing thread rod 411 are then tightened. This facilitates the assembling procedure of the table.

It is to be understood that the above description and drawings are only used for illustrating one embodiment of the present invention, and are not intended to limit the scope thereof. Any variation and derivation from the above description and drawings should be included in the scope of the present invention.

What is claimed is:

1. A connector assembly for connecting board-like members of a piece of furniture, each board-like member having a hole therein, comprising:

more than one arch rod member having a male end and a female end, wherein said male end includes a tenon formed by a screw fitted through a sleeve, the screw passing through said hole in the board-like member into a threaded hole of said male end and said female end is formed with a hole for receiving said tenon therein, a radial threaded hole being included on said female end to receive a fixing thread rod therein engaging said tenon of said male end in place in said female end, and flexible pad members, each having a hole therein, are secured on each side of said board-like members such that said screw of said tenon passes through said hole in said flexible pad members;

said male ends of said rod members being received in said female ends of said rod members to join said rod members end-to-end so as to form a circular connector assembly.

* * * * *